United States Patent
Swartzendruber et al.

(10) Patent No.: US 9,386,529 B2
(45) Date of Patent: Jul. 5, 2016

(54) POWER MANAGEMENT IN A NETWORK OF STATIONARY BATTERY POWERED CONTROL, AUTOMATION, MONITORING AND PROTECTION DEVICES

(75) Inventors: Ryan W. Swartzendruber, Prospect Heights, IL (US); Laurence V. Feight, Island Lake, IL (US)

(73) Assignee: SCHWEITZER ENGINEERING LABORATORIES, INC., Pullman, WA (US)

( * ) Notice: Subject to any disclaimer, the term of this patent is extended or adjusted under 35 U.S.C. 154(b) by 732 days.

(21) Appl. No.: 13/605,679

(22) Filed: Sep. 6, 2012

(65) Prior Publication Data

US 2014/0064162 A1 Mar. 6, 2014

(51) Int. Cl.
*H04W 52/02* (2009.01)

(52) U.S. Cl.
CPC ............ *H04W 52/0261* (2013.01); *Y02B 60/50* (2013.01)

(58) Field of Classification Search
CPC .. H04B 1/7073; H04B 1/7103; H04B 7/0608; H04W 72/0406; H04W 74/08; G01D 4/002; H04L 1/1867; H04L 1/0061; H04L 27/233; H04L 1/1819; H04L 7/0004; H04L 2027/0065; H04L 1/0057; H04L 1/0038; H04L 1/0046; H04J 13/00; H04J 13/0029
USPC ........................................................ 375/145
See application file for complete search history.

(56) References Cited

U.S. PATENT DOCUMENTS

| | | | |
|---|---|---|---|
| 3,239,678 A | 3/1966 | Kolm | |
| 5,293,323 A | 3/1994 | Doskocil | |
| 5,465,399 A * | 11/1995 | Oberholtzer | H04W 52/228 455/522 |
| 5,726,644 A * | 3/1998 | Jednacz et al. | 340/9.14 |
| 5,861,684 A | 1/1999 | Slade | |
| 6,029,074 A * | 2/2000 | Irvin | H04W 52/367 455/127.5 |
| 6,304,176 B1 | 10/2001 | Discenzo | |
| 6,492,910 B1 | 12/2002 | Ragle | |
| 6,657,418 B2 | 12/2003 | Atherton | |
| 6,816,439 B1 | 11/2004 | Kawahara | |
| 6,894,478 B1 * | 5/2005 | Fenske | 324/127 |
| 7,060,379 B2 | 6/2006 | Speranza | |
| 7,103,786 B2 | 9/2006 | Chen | |
| 7,132,763 B2 | 11/2006 | Rendic | |
| 7,170,194 B2 | 1/2007 | Korcharz | |

(Continued)

FOREIGN PATENT DOCUMENTS

| | | |
|---|---|---|
| WO | 2009009453 | 1/2009 |
| WO | 2009088652 | 7/2009 |

(Continued)

OTHER PUBLICATIONS

Cooper Power Systems, GrideAdvisor;OutageAdvisor Fault Detection and Location Solution; Increase Reliability, Locate Outages, Shorten Reponse Time, B320-08001, 2008, www.cooperpower.com.

(Continued)

*Primary Examiner* — Redentor Pasia
*Assistant Examiner* — Peter Mak
(74) *Attorney, Agent, or Firm* — Eugene M. Cummings, P.C.; Richard M. Edge (57) ABSTRACT

A faulted circuit indicator periodically joins a network to report information and receive commands. The faulted circuit indicator optimizes the transmit power used to join the network so that an acceptable network acquisition time and/or robust routing through multiple nodes are obtained.

25 Claims, 11 Drawing Sheets

(56) References Cited

U.S. PATENT DOCUMENTS

| | | |
|---|---|---|
| 7,274,168 B2 | 9/2007 | Tskukamoto |
| 7,315,169 B1 | 1/2008 | Fenske |
| 7,339,353 B1 | 3/2008 | Masias |
| 7,369,950 B2 | 5/2008 | Wall |
| 7,382,272 B2 | 6/2008 | Feight |
| 7,385,374 B2 | 6/2008 | Frantz |
| 7,398,101 B2 | 7/2008 | Zinn |
| 7,411,371 B2 | 8/2008 | Hobbs |
| 7,667,482 B2 | 2/2010 | Mort |
| 7,948,352 B2 | 5/2011 | Tang |
| 7,983,230 B1 * | 7/2011 | Li ................ H04W 52/262 370/338 |
| 8,103,463 B2 | 1/2012 | Kalgren |
| 2001/0054878 A1 | 12/2001 | Odaohhara |
| 2003/0020332 A1 | 1/2003 | Giannopoulos |
| 2003/0111908 A1 | 6/2003 | Christensen |
| 2004/0036359 A1 | 2/2004 | Griffith |
| 2004/0078606 A1 | 4/2004 | Chen |
| 2004/0256915 A1 | 12/2004 | Phinney |
| 2005/0006956 A1 | 1/2005 | Shi |
| 2005/0253560 A1 | 11/2005 | Popescu-Stanesti |
| 2007/0269219 A1 | 11/2007 | Teller |
| 2008/0122518 A1 | 5/2008 | Besser |
| 2008/0174278 A1 | 7/2008 | Masias |
| 2008/0287082 A1 | 11/2008 | Govindswamy |
| 2009/0243796 A1 | 10/2009 | Tieman |
| 2010/0013632 A1 * | 1/2010 | Salewske ........... G01R 19/2513 340/540 |
| 2011/0001485 A1 | 1/2011 | Feight |
| 2013/0301683 A1 * | 11/2013 | Sinsuan ............. H04B 1/7103 375/145 |

FOREIGN PATENT DOCUMENTS

| | | |
|---|---|---|
| WO | 2010020833 | 2/2010 |
| WO | 2010027343 | 3/2010 |

OTHER PUBLICATIONS

Cooper Power Systems, GridAdvisor;OutageAdvisor Fault Detection and Location Solution; Cellular Communications, B320-08002, 2008, www.cooperpower.com.

Cooper Power Systems, GridAdvisor; OutageAdvisor Fault Detection and Location Solution; Sensus FlexNet Communications, B320-08003, 2008, www.cooperpower.com.

Cooper Power Systems, GridAdvisor, Exchange, B320-08004, 2008, www.cooperpower.com.

Cooper Power Systems, GridAdvisor, WebExchange, B320-08005, 2008, www.cooperpower.com.

CYMBET™ Corporation, White Paper: Permanent Power for Wireless Sensors, DOC WP-72-01 rev 1, 2008, www.cymbet.com.

Tollgrade Communications, Inc., LightHouse™ Continuous Grid Intelligence™, 2008, www.tollgrade.com.

University of Michigan, University of Michigan News Service, Michroship sets low-power record with extreme sleep mode, 39612, http://www.ns.umich.edu/htdocs/releases/print.php?htdocs/releases/plainstory.php?id=661 . . . .

PCT/US2009/049951, Patent Cooperation Treaty International Search Report and Written Opinion of the International Searching Authority, Sep. 3, 2009.

Jeffrey L. Barlow, Characterizing Dynamic Power and Data Rate Policies for Wirelessusb Networks, Department of Computer Science, Brigham Young University, Aug. 2006.

Jason L. Hill, David E. Culler, Mica: A Wireless Platform for Deeply Embedded Networks, 2002.

Cooper Power Systems, GrideAdvisor;OutageAdvisor Fault Detection and Location Solution; Increase Reliability, Locate Outages, Shorten Reponse Time, B320-08001, Jan. 2008, www.cooperpower.com.

Cooper Power Systems, GridAdvisor;OutageAdvisor Fault Detection and Location Solution; Cellular Communications, B320-08002, Jan. 2008, www.cooperpower.com.

Cooper Power Systems, GridAdvisor; OutageAdvisor Fault Detection and Location Solution; Sensus FlexNet Communications, B320-08003, Jan. 2008, www.cooperpower.com.

Cooper Power Systems, GridAdvisor, Exchange, B320-08004, Jan. 2008, www.cooperpower.com.

Cooper Power Systems, GridAdvisor, WebExchange, B320-08005, Jan. 2008, www.cooperpower.com.

CYMBET™ Corporation, White Paper: Permanent Power for Wireless Sensors, DOC WP-72-01 rev 1, Jan. 2008, www.cymbet.com.

Tollgrade Communications, Inc., LightHouse™Continuous Grid Intelligence™, Jan. 2008, www.tollgrade.com.

University of Michigan, University of Michigan News Service, Michroship sets low-power record with extreme sleep mode, 39612, http://www.ns.umich.edu/htdocs/releases/print.php?htdocs/releases/plainstory.php?id=661 . . . , Jun. 2008.

Jason L. Hill, David E. Culler, Mica: A Wireless Platform for Deeply Embedded Networks, Nov. 2002.

PCT/US2013/058072, Patent Cooperation Treaty International Search Report and Written Opinion of the International Searching Authority, Feb. 14, 2014.

\* cited by examiner

POWER MANAGEMENT IN A NETWORK OF STATIONARY BATTERY POWERED CONTROL, AUTOMATION, MONITORING AND PROTECTION DEVICES

FIELD OF THE INVENTION

The present disclosure relates to the conservation of power by wireless network devices, and more particularly to the conservation of power by stationary battery powered wireless network devices used to monitor an electrical power distribution system, such as, for example, faulted circuit indicators.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIGS. 9a and 9b are network diagrams illustrating the range that a discontinuously powered stationary network node can communicate using different transmit powers, and the subsequent effect on the number of nodes that the discontinuously powered stationary network node can communicate with;

FIG. 11 is a flowchart illustrating a process by which a battery powered stationary network node can determine what power setting to send a message at.

DETAILED DESCRIPTION

Figure 1:
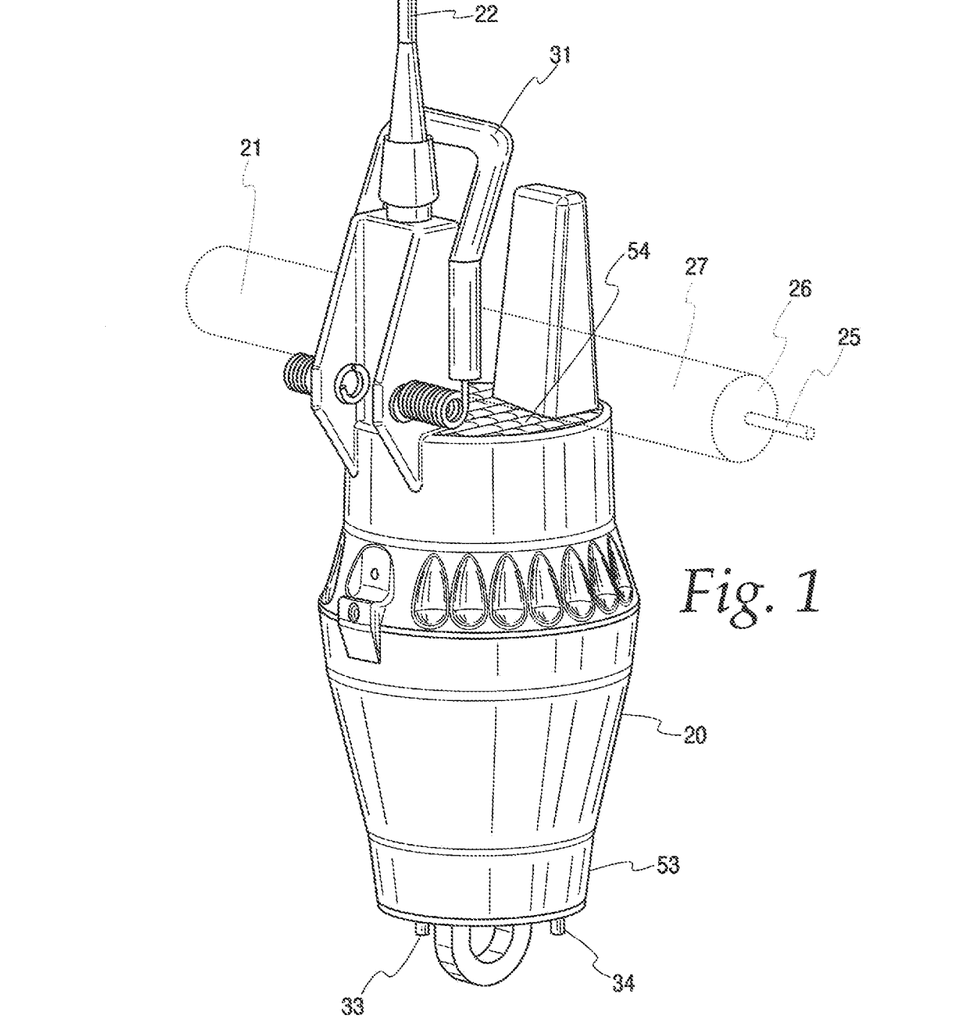
FIG. 1 is a perspective view of a clamp-on faulted circuit indicator adapted to wirelessly communicate with a network of other stationary control, automation, monitoring and protection devices.

Turning to the Figures and to FIG. 1 in particular, a clamp-on faulted circuit indicator 20 is constructed in accordance with the disclosure. Faulted circuit indicator 20 indicates fault currents in an electrical feeder or distribution cable 21. Cable 21 may be part of an overhead distribution system or an underground distribution system, such as where the cable comes up from the ground at a pad-mounted transformer. In accordance with conventional practice, faulted circuit indicator 20 is attached to the outer surface of the cable 21, which may include a central conductor 25, a concentric insulating layer 26, and an electrically grounded rubber outer sheath 27.

Figure 2:
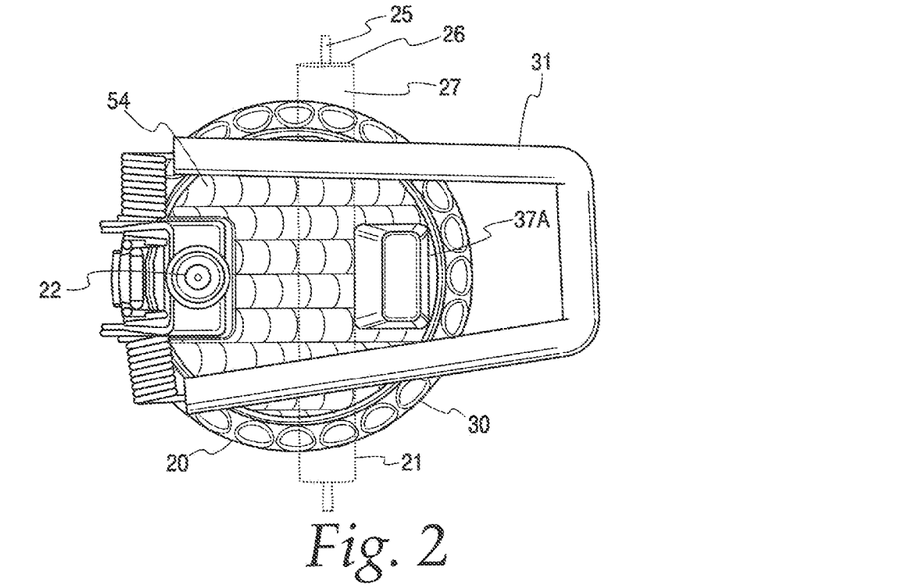
FIG. 2 is a top view of the faulted circuit indicator of FIG. 1.

Faulted circuit indicator 20 includes a housing 30 (FIG. 2) that contains electronic circuitry for sensing and responding to fault currents in cable 21. A current transformer is located within housing 30 in an orientation that is generally perpendicular to the rear face of housing 30. The exterior portion of pole piece 37a may be coated with an insulative material or may have an insulating material disposed thereon. A clamp assembly 31 attaches the module to a monitored conductor, such as cable 21, and holds cable 21 in close proximity to the pole piece 37a of the current transformer. Clamp assembly 31 is designed to accommodate a range of cables 21 having different diameters. Current transformer 37 senses the load current in conductor 21 and provides a signal representative of the load current to electronic circuitry 100, which is discussed below. An electrostatic sensor is disposed between current transformer 37 and the rear wall of housing 30. The sensor senses the electromagnetic field about conductor 21 and likewise provides a signal representative of the electromagnetic field to electronic circuitry 100. As discussed further herein, the top of faulted circuit indicator 20 may be covered with solar cells 54, or, alternatively, it may be formed of a hard clear or solid plastic or other material depending on the particular application for the faulted circuit indicator 20.

Figure 3:
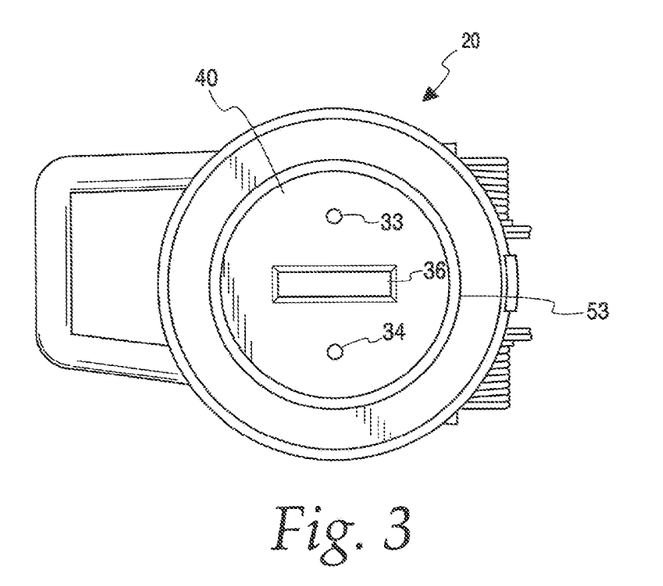
FIG. 3 is a bottom view of the faulted circuit indicator of FIG. 1.

Turning to FIG. 3, an eye 36 on an end cap 53 of the housing may be provided to allow use of a conventional hotstick during installation or removal of faulted circuit indicator 20 about cable 21. When installed on an overhead cable, faulted circuit indicator 20 normally hangs downward such that a face 40 containing the status indicators, such as LEDs 33-34, are easily viewed from the ground by service personnel or the like. The LEDs 33-34 may be mounted in a hard clear or solid plastic, or other material, so as to allow for easy viewing by line personnel.

Housing 30 and end cap 53 may be formed from any suitable material, such as plastic. End cap 53 forms part of the housing 30, and may be sonically welded to housing 30 to seal the interior of fault indicator 20 against contamination. Electronic circuitry 100 also includes status indicators, such as two LEDs 33-34, to indicate whether a fault has occurred on cable 21. In operation, during normal current flow through conductor 21, LEDs 33-34 are normally off and not illuminated. Upon occurrence of a fault in a monitored conductor, LEDs 33 and 34 are illuminated by electronic circuitry 100 to indicate that a fault has occurred. For best viewing from different angles of view, LEDs 33-34 may be nearly flush with the exterior surface of end cap 53. If desired, LEDs 33-34 may project slightly above the face 40 of the end cap 53, or end cap 53 may be provided with convex lenses (not shown) to provide illumination in about a 180 degree field of view for better viewing by service personnel. LEDs 33-34 may be selected from any color commercially available. For example, LEDs 33 and 34 may be red for indicating a permanent fault. If one or both of LEDs 33 or 34 is used for indicating a temporary fault, it may be selected as a different color than red, such as yellow. End cap 53 is preferably of a contrasting color to LEDs 33-34 such as dark blue, for better visibility of the LEDs.

Figure 4:
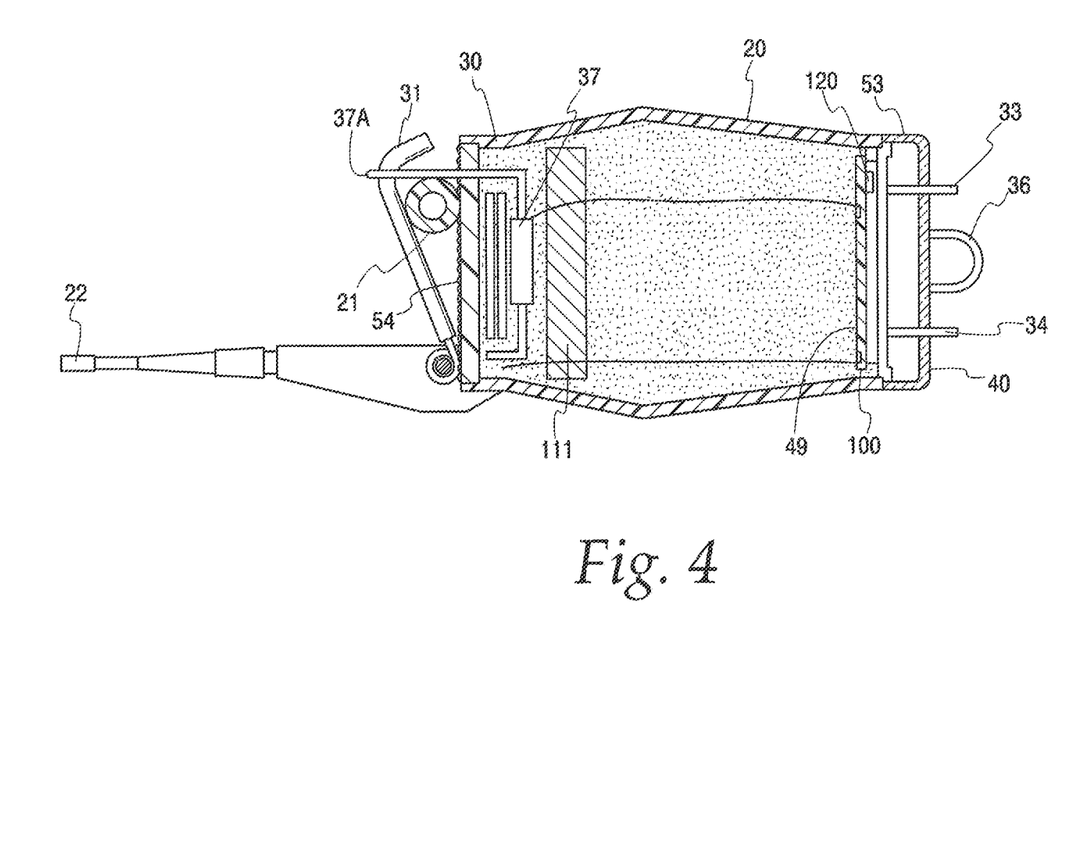
FIG. 4 is an inverted cross-section view of the faulted circuit indicator of FIGS. 1-3.

With reference to FIG. 4, a circuit board 49 is disposed in the housing 30 near the face end thereof. Circuit board 49 contains most of the electronic circuitry 100 used to operate faulted circuit indicator 20, and is discussed in greater detail below. Circuit board 49 also powers and operates LEDs 33-34, a magnetic reset switch 120, and various other components.

An antenna 22 provides connectivity with a wireless network. Note, that while an extruding antenna is depicted for clarity, production devices may have the antenna integrated into the circuit board 49. Alternatively, antenna 22 may advantageously be a directional antenna or directional antenna array, which can be directed at the nearest neighbor(s) of the faulted circuit indicator 20.

Figure 5:
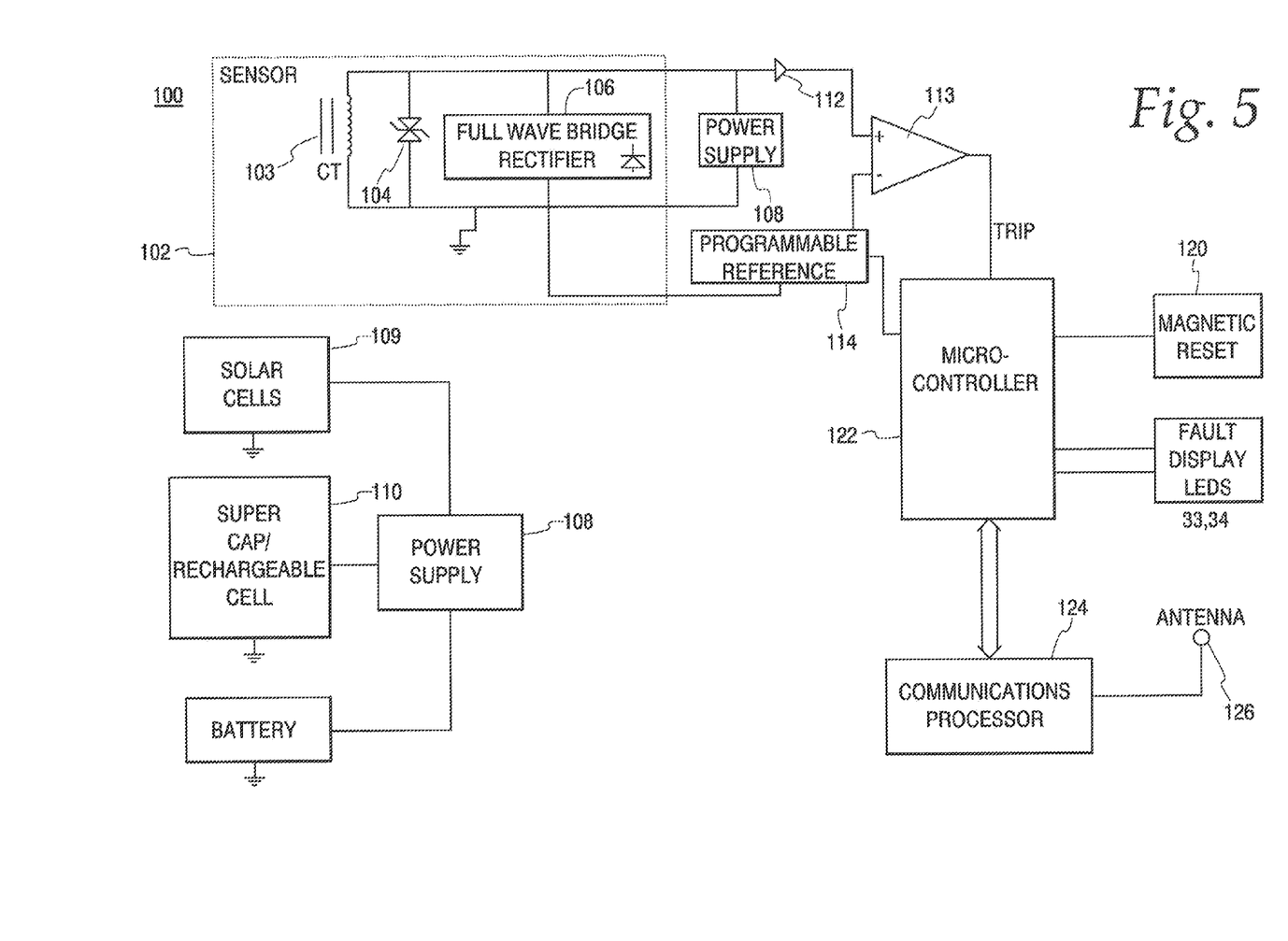
FIG. 5 is a block diagram illustrating electronic circuitry for operating the faulted circuit indicator of FIGS. 1-3.

Turning to FIG. 5, an exemplary embodiment of the circuitry 100 discussed above is depicted. A current sensing circuit 102 acquires an analog representation of the circuit flowing through conductor 21. The current sensing circuit includes a current transformer 103 which generates a voltage signal proportional to the magnetic field generated by the current flowing through conductor 21. Sensor 102 may also include a peak limiting device 104 to clamp the maximum voltage output by the current transformer to a safe level. The output of sensor 102 is coupled to a full wave rectifier 106, which may be a full wave diode bridge rectifier. The full wave bridge rectifier 106 transforms the alternating current signal acquired by current transformer 103 to a direct current representation. The output of full wave diode bridge 106 is coupled to microcontroller 122 through amplifier 112, as well as to power supply 108.

Power supply 108 supplies operating power for the faulted circuit indicator generally, and circuitry 100 in particular. Generally, power supply 108 operates in accordance with the principles of earlier filed U.S. patent application Ser. No. 12/497,820, entitled "Energy Management for an Electronic Device," filed on Jul. 6, 2009 in the name of inventors Laurence V. Feight, and Ryan W. Swartzendruber, both of Schweitzer Engineering Laboratories, Inc. of Pullman, Wash. The previously referenced application is hereby incorporated by reference in its entirety. Briefly, power supply 108 will favor drawing energy from intermittent power sources, such as solar cells 109. However, when sufficient energy is not available from intermittent power sources, parasitic power sources, such as the inductively coupled power drawn by sensor 102 and output by full wave rectifier 106 is used. When neither intermittent power sources nor parasitic power sources are available, such as during a fault at nighttime or low light conditions, rechargeable power sources, such as super capacitor and/or rechargeable cell 110 will be used until exhausted, at which point, a continuous power source, such as battery 111 is used. As explained more fully in "Energy Management for an Electronic Device," this energy management strategy effectively extends the lifetime of a continuous, but exhaustible, power supply, such as a battery, indefinitely, dependent on operating conditions.

The output of full wave rectifier 106 is also coupled to amplifier 112. The output of amplifier 112 couples to the positive input of comparator 113. The negative input of comparator 113 is coupled to a programmable reference 114. The output of comparator 113, which is indicative of a fault on the monitored conductor, is coupled to a digital input of microcontroller 122. Microcontroller 122 controls the fault current level by programming the output of programmable reference 114. This level may be fixed at the factory based on customer specifications, or it may be customer programmable through the radio interface disclosed herein.

In addition, microcontroller 122 also controls fault display LEDs 33,34 to display permanent and/or temporary faults as they are detected. In addition, microcontroller 122 is coupled to a magnetic reset switch 120, which is operated via an external magnet to reset the faulted circuit indicator from a fault condition.

Microcontroller 122 is also coupled to a communication processor 124, which communicates through antenna 126. The communication processor 124 can communicate, for example, fault information, status information, such as monitored current, and configuration information, such as trip level. In addition, microcontroller 122 operates communication processor 124 as disclosed herein to advantageously reduce transmit power.

Figure 6A:
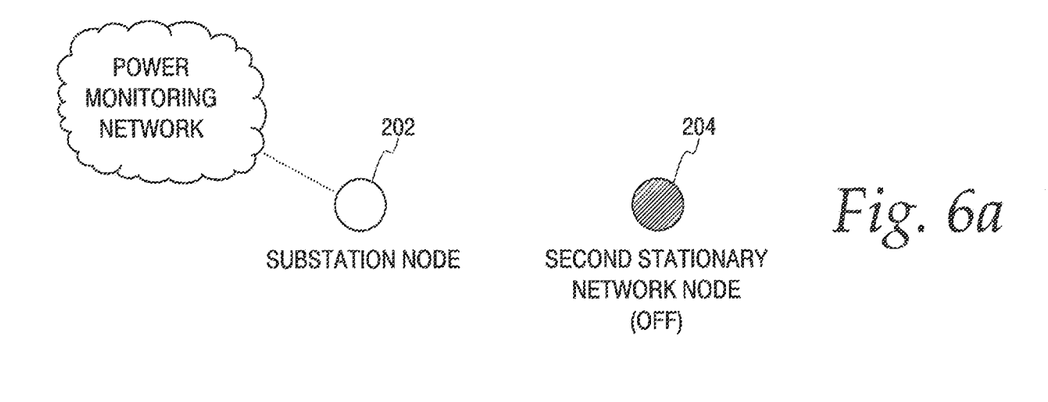
FIGS. 6a and 6b are network diagrams illustrating a simple two node network comprising an always-on substation node coupled to a wide area power monitoring network and a single stationary network node.
Figure 6B:
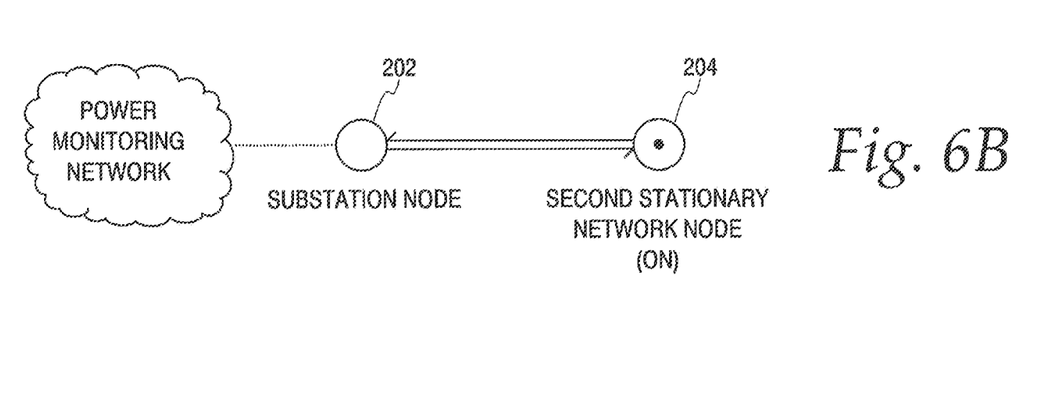

FIGS. 6a and 6b are network diagrams of a simple network topology involving two stationary network nodes. The first stationary network node 202 is hereinafter referred to as the substation node, as it will generally be disposed within an electrical substation, or in communication with other network equipment disposed within an electrical substation. The substation node 202 is assumed to be always on and available for communication. The second stationary network node 204 can be a power distribution system monitoring device, such as a faulted circuit indicator. Generally, the second stationary network node 204 provides power to its network circuitry as necessary, and is normally in the off state as depicted in the FIG. 6a. As explained further herein, the second stationary network node 204 adjusts its transmit power over time to optimize its network acquisition time. Network acquisition time is the time that is required for a potential network node to join a particular network. Generally, the network acquisition process involves the assignment of a network address to the potential network node, as well as updating routing information for any new neighbors of the potential network node, and transmitting routing information to the potential network node. FIG. 6b shows the second stationary network node 204 after it has joined the power monitoring network by completing the network acquisition process with substation node 202. After secondary network node 204 completes the network acquisition process, it will transmit any data that it has queued up, receive any data that is addressed to it, and, after processing the received data, power down its network circuitry to conserve power.

Figure 7:
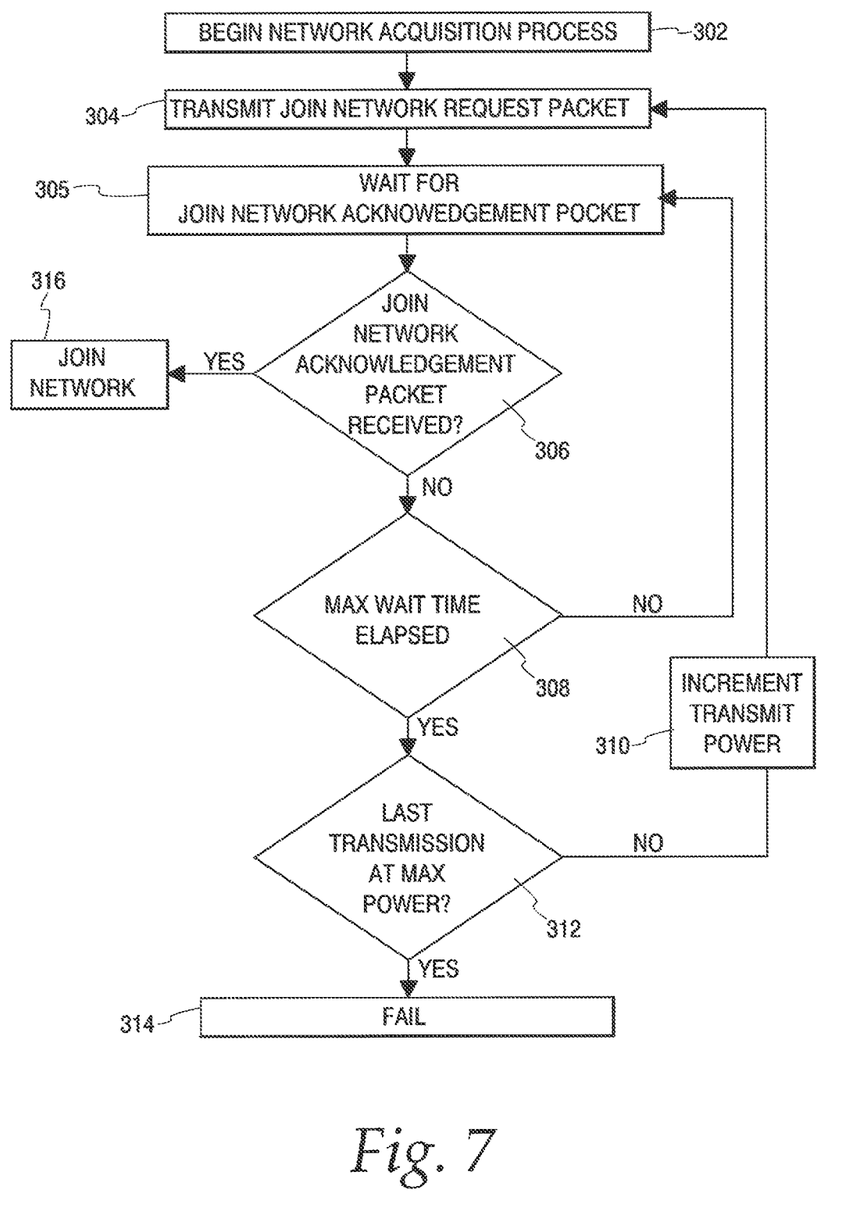
FIG. 7 is a flowchart illustrating a process by which a stationary network node can join a power monitoring network with a minimum required transmit power.

FIG. 7 is a flow chart depicting a process by which a stationary potential network node can join a wireless network and achieve an optimized combination of network acquisition time and transmit power. The detailed process seeks a minimum transmit power for an acceptable network acquisition time. Generally, additional transmit power allows for a greater transmission range. At the outskirts of the range for a particular transmission power, data packets may still be successfully sent, but errors are more apt to occur. Accordingly, the desired transmission power is that the minimum that allows for error free transmission of packets.

In a step 302 the stationary potential network node provides power to its network circuitry, initializes internal variables, and performs other tasks associated with beginning the network acquisition process. As part of beginning the network acquisition process, the potential network node initializes it's transmit power. The process by which it initializes it's transmit power is generic. For example, it can include using the lowest possible transmit power, or using a stored transmit power. In a step 304 the stationary potential network node broadcasts a "join network request" packet. A join network request packet is a generic denominator for any packet that indicates a potential network node that seeks to join a particular network.

The stationary potential network node then waits for a reply from a network node in step 305. In step 306, a check is made to determine whether a join network acknowledgement packet has been received. A join network acknowledgement packet is any packet that indicates acceptance of the potential network node into a network. The join network acknowledgement packet may provide the potential network node with routing information necessary to communicate with its nearest neighbors, or this information can be provided in a separate packet. If no join network acknowledgement packet is received, then the node determines whether the maximum wait time has lapsed in step 308. If the maximum wait time was not exceeded, then the node returns to determine whether the join network acknowledgement packet was received in step 306. If the maximum wait time was exceeded prior to receiving a join network acknowledgement packet, execution transitions to step 312, where a check is made to determine if the last transmission was made at maximum transmission power. If so, the network acquisition process fails, and execution transitions to step 314. To indicate a failure, the network node can light and/or flash one of the LEDs 33, 34. The LED may be turned off after some period of time, such as, for example, 5 minutes, to conserve power, or it may be operated continuously until the situation is corrected by maintenance personnel.

However, if the last transmission was not made at maximum power, execution transitions from step 312 to step 310, where the transmit power is increased. The algorithm used to increase the transmit power is generic, in that it may encompass any applicable algorithm used to intelligently increase the transmit power; for example, the transmit power can be uniformly increased by one unit, or it can be increased by a higher increment if no data was received in response to the join network request packet, such as 10 units. Execution then transitions to step 304, where execution proceeds as previously outlined.

Returning to step 306, if the join network acknowledgement packet is received, execution transitions to step 316, where the network node performs the tasks required to reflect its status as part of the network. These tasks may include, for example, creating or updating routing information with its nearest neighbors based on data received during the network acquisition process.

Figure 8:
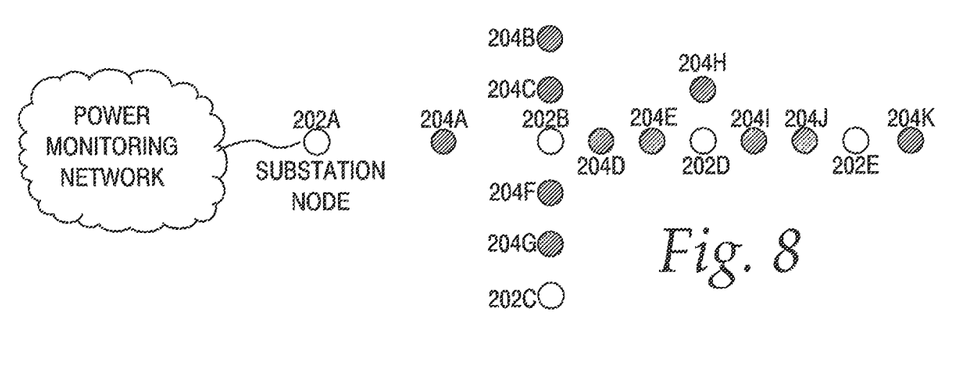
FIG. 8 is a network diagram illustrating a more complicated mesh network comprising multiple always-on repeater nodes and discontinuously powered stationary network nodes.

FIG. 8 depicts a more complicated wireless network topography, known as a wireless mesh network. In particular, a number of always-on stationary network nodes 202a-e are depicted, hereinafter, referred to as repeaters. In addition, a number of stationary secondary nodes 204a-k are also depicted. As explained with respect to FIG. 5, these nodes are not "always on;" instead they power on their network circuitry as necessary to occasionally send and receive data. With respect to FIG. 8, it should be assumed that at maximum transmit power node 204k can communicate with repeaters 202d and 202e, while at a much lower transmit power, node 204k can only communicate with repeater 202e. The following network acquisition process expands on the earlier disclosed process by accounting not only for network acquisition time versus transmit power, but also the number of repeaters that a node can communicate with versus transmit power. This metric becomes more important when "urgent" data, such as a fault condition, needs to be communicated. In particular, when communicating with multiple repeaters, the repeater offering the fastest communication to the destination node can be chosen.

Figure 9A:
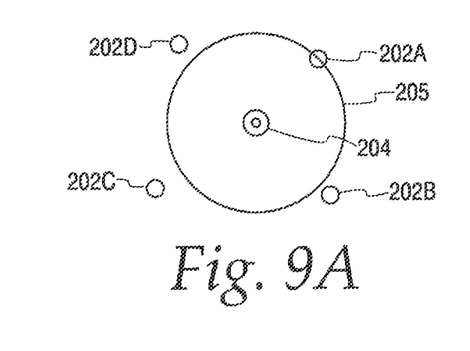

FIG. 9a illustrates the communication coverage of a network node in a populated network environment, such as that of FIG. 8, using the process of FIG. 7 or a similar process to communicate at the minimum network power required to communicate with one neighbor repeater. As depicted discontinuously powered stationary network node 204 uses the minimum transmit power to communicate with always-on network node 202a (which may be the physically closest node, the node with the least interference therebetween, or the like). The minimum transmit power produces a radius 205. However, as depicted, three additional always-on network nodes are removed just outside the radius 205, so that a slightly higher transmit power would capture those nodes. Using a process such as that depicted in FIG. 6, network node 204 will not have the required information to know that with a slightly higher transmit power, much more robust communication can be achieved.

Figure 9B:
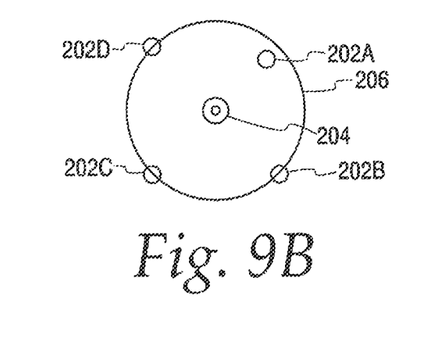

FIG. 9b shows a corresponding situation when discontinuously powered stationary network mode 204 uses a higher power setting determined using a different network acquisition process to allow communication with three additional repeaters 202b-d. As illustrated, by using a higher power setting, network node 204 can communicate with all nodes within radius 206.

Figure 10A:
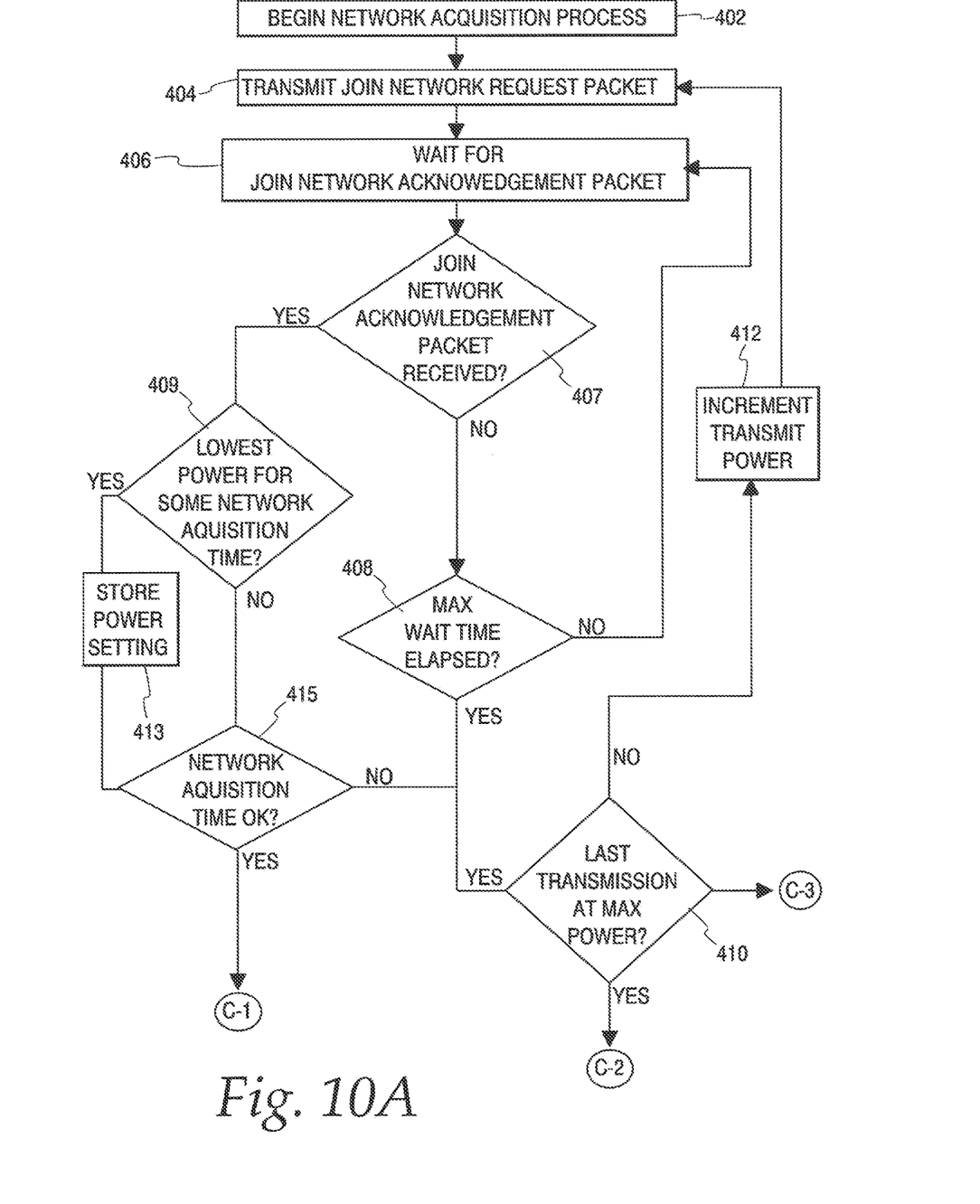
FIGS. 10a and 10b illustrate a flowchart illustrating a process by which a stationary network node can join a power monitoring network with a level of transmit power optimized for network acquisition time and the number of communicating nodes.
Figure 10B:
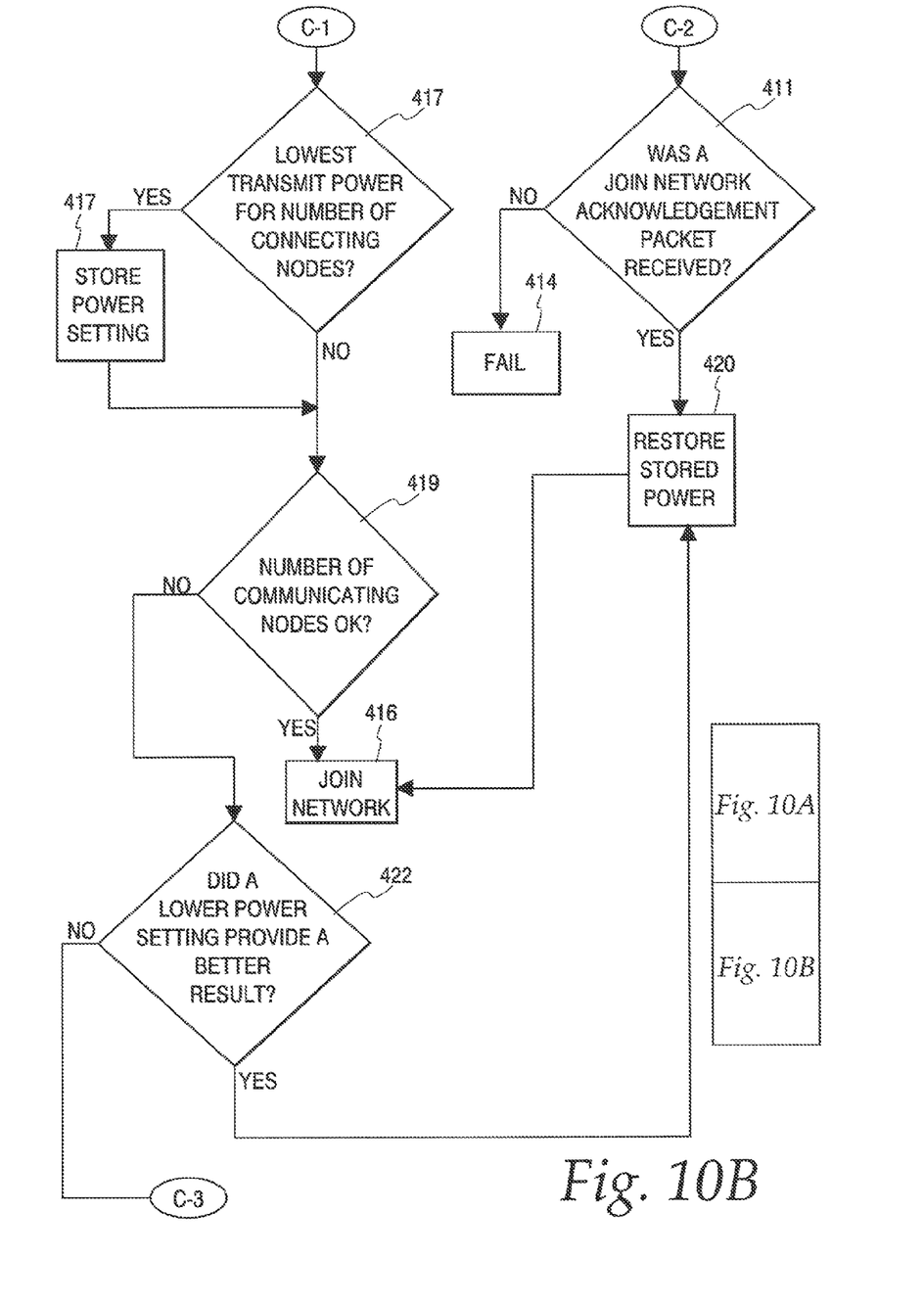

FIGS. 10a and 10b comprise a flow chart depicting a process by which a stationary potential network node can join a wireless network and achieve an optimized combination of network acquisition time versus transmit power as well as optimizing the number of repeater nodes that can be communicated with versus transmit power. In step 402, the stationary potential network node begins the network acquisition process. In a step 404 the stationary potential network node broadcasts a join network request packet. The potential network node awaits a response to the join network request packet in step 406 and determines whether the join network acknowledgement packet is received in step 407. If no join network acknowledgement packet is received, then the node determines whether the maximum wait time has elapsed in step 408. If the maximum wait time was not exceeded, then the node returns to determine whether the join network acknowledgement packet was received 407. If the maximum wait period has elapsed, execution transitions to step 410, where a check is made to determine if the last transmission was made at maximum transmit power. If so, execution transitions to step 411, where a check is made to determine if a join network acknowledgement packet was received at all. This step is required to address situations where a join network acknowledgement packet is received, but an acceptable network acquisition time was not achieved and/or the maximum transmit power does not allow communication with a sufficient number of nodes for robust routing. In this case, if the maximum wait time elapsed, no join network acknowledgement packet was received, and execution transitions to step 414, which reflects a failure to join the network. However, if a join network acknowledgement packet had been previously received, execution transitions to step 420, where a previously saved transmit power setting is restored. From there, execution transitions to step 416, where the network is joined using a functional, if not optimal, power setting. The network join process proceeds as previously outlined with respect to the process of FIG. 7. Returning to step 410, if the last transmission was not made at maximum power, execution transitions to step 412, where transmit power is incremented.

When a join network acknowledgement packet is successfully received in step 406, execution transitions to step 409, where a check is made to determine if the transmit power used to transmit join network request packet was the lowest transmit power used to obtain a similar network acquisition time. Note that similar network acquisition time covers different, and arbitrary, degrees of granularity. In some applications, network acquisition time can be defined on one millisecond boundaries. In other applications, five second, or even 30 second, boundaries would be more appropriate. If the transmit power was the lowest that obtained a similar network acquisition time, execution transitions to step 413, where the power setting is saved, and from there execution transitions to step 415. Similarly, in step 409, if the transmit power used to transmit the previous join network request packet was not sent with the lowest transmit power for a similar network acquisition time, execution transitions directly to step 415, where a comparison between the network acquisition time and a metric is made to determine if the network acquisition time is deemed acceptable. This check can involve a comparison with an absolute number; i.e., any time period under 50 seconds is deemed acceptable. Alternatively, this check could involve a comparison of stored time/milliwatt values; i.e., if a previous value obtained a network acquisition time of 60 seconds with a transmit power of 250 milliwatts, and a subsequent attempt obtains a network acquisition time of 50 seconds with a transmit power of 300 milliwatts, the savings of ten seconds may or may not be deemed an acceptable benefit for the cost of 50 milliwatts transmit power depending on the individual configuration of the stationary potential network node. If the network acquisition time is not deemed acceptable, execution transitions to step 410, where execution proceeds as previously discussed.

However, if at step 415, the network acquisition time is deemed acceptable, execution transitions to step 417. In step 417, a check is made to determine if the transmit power used to transmit the previous join network request packet was the lowest transmit power used to obtain the same number of communicating nodes. If so, execution transitions to step 418, where the power setting is saved. Execution then transitions to step 419.

Similarly, if at step 417, the power setting used to transmit the previous join network request packet was not the lowest power setting that obtained the same number of communicating nodes, execution transitions to step 419. In step 419, a comparison between the number of communicating nodes and a metric is made to determine if communication has been achieved with the number of nodes deemed necessary for robust routing. This check can involve, for example, a comparison between the number of communicating nodes and an absolute level. Similarly, the check can involve a comparison between a derived metric based on prior attempts at joining the network. For example, a previous attempt at joining the network with a transmit power of 250 milliwatts resulting in one communicating node, could be used to derive a metric. A present attempt at joining the network with a transmit power of 300 milliwatts resulting in four communicating nodes would be compared against the derived metric, and depending on the relative importance placed on transmit power versus the additional communication robustness achieved with three additional communicating nodes, a decision would be made as to whether the incremental increase in transmit power was justified. If not, execution transitions to step 422, where a check is made to determine if a previous power setting provided a better tradeoff between transmit power and the number of communicating nodes. If a previous power setting did provide a better tradeoff, then execution transitions to step 420, where the previous power setting is restored. However, if no previous power setting provided a better tradeoff, then execution transitions to step 423, where a check is made to determine if the last power setting actually provided any communicating nodes. If so, execution transitions to step 410, where execution proceeds as previously discussed.

Returning to step 419, if communication has been achieved with a sufficient number of nodes for robust routing, execution transitions to step 416, where the potential stationary network node joins the network, as in the earlier described process.

A number of variations of the above network acquisition process are also envisioned within the scope of this disclosure. A simple variation would be for the stationary potential network node to only reevaluate its transmit power levels periodically, such as once per hour, day, etc., or as required; i.e., when a previously functional transmission power level no longer allowed communications. Further enhancements to such a system would be for the potential stationary network node to save multiple power transmission levels; i.e., one which allowed communications with a single network node, and one that allowed robust routing through multiple network nodes. The first transmission power level could be used for normal communications, while the second could be used for higher priority or urgent communications. In one enhancement, the system may save power transmission levels; i.e., levels that provided communications with an acceptable number of network nodes, and use the saved power transmission level as the first transmission level attempted, such as in steps 304 or 404 of FIGS. 7 and 10A.

Further, the stationary potential network node to only reevaluate its transmit power levels according to the existing network traffic. In one embodiment, the stationary potential network node may monitor communications thereto, and only reevaluate its transmit power levels during periods of no communications thereto. Available power sources are also a consideration in radio transmissions. In another embodiment, therefore, the stationary potential network node may include multiple power sources such as, for example, a parasitic power source and a continuous power source (such as a battery). Because the battery may have a limited lifetime, the stationary potential network node may be configured to conserve the battery. Accordingly, the potential network node may be configured to only reevaluate its transmit power levels when sufficient power therefore is available from the parasitic power source. In other embodiments, the stationary potential network node may be configured to only reevaluate its transmit power levels when sufficient power therefore from an intermittent power source is available and/or when sufficient power therefore from a rechargeable power source is available.

Accordingly, FIG. 7 presents a process that determines the minimum transmit power that a node requires to communicate with a network, while FIG. 10 presents a more flexible process that determines a power level, using a user determine metric, that provides for robust communication with a network. However, in certain situations, power savings may be secondary to exerting all possible efforts to transmit a message. For example, when a faulted circuit indicator detects a trip, it needs to communicate the message as quickly and reliably as possible to the rest of the network. In such a situation, maximum transmit power can be used to ensure that the urgent message is communicated as quickly as possible.

Figure 11:
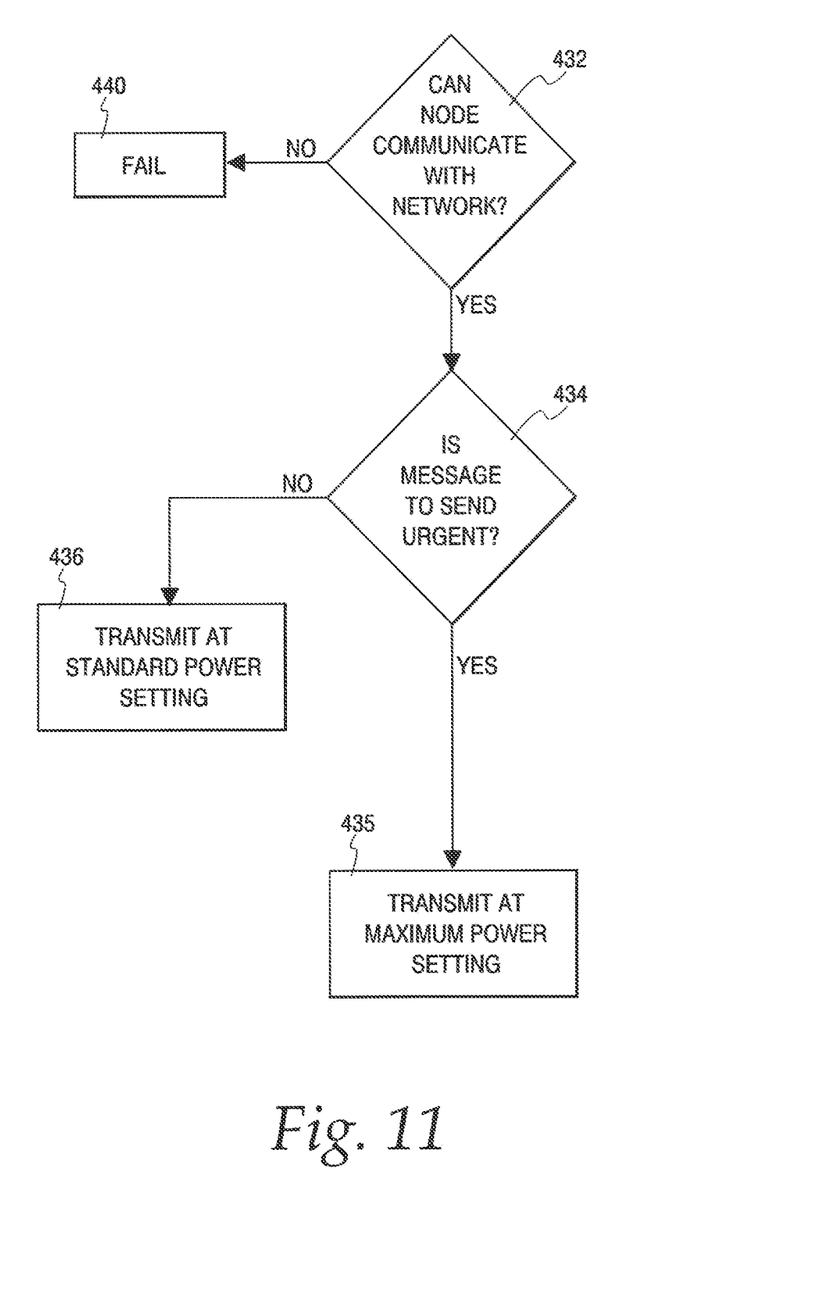

FIG. 11 presents a process by which a battery powered stationary network node can determine what power setting to send a message at. In step 432, the battery powered stationary network node checks to determine whether it can communicate with its target network. If not, the process exits in step 440. However, if the stationary network node can communicate with the target network, it determines whether the present message is urgent in step 434. If it is not, execution transitions to step 436, where the message is sent with the standard power setting, which can be determined using, for example, the processes of FIG. 7 or 10. Returning to step 434, if the message to send is urgent, execution transitions to step 438, where the message is sent with maximum transmit power.

Another improvement that can be made would be to vary the power setting depending on the power source. For example, when the stationary network node is powered by a battery, the standard power setting, as derived by, for example, the process of FIG. 7 or the process of FIG. 10 can be used. However, when the stationary network node is utilizing a different power source, such as a parasitic power source, e.g., line power, or a renewable power source, e.g., solar power, maximum power can be used.

Figure 12:
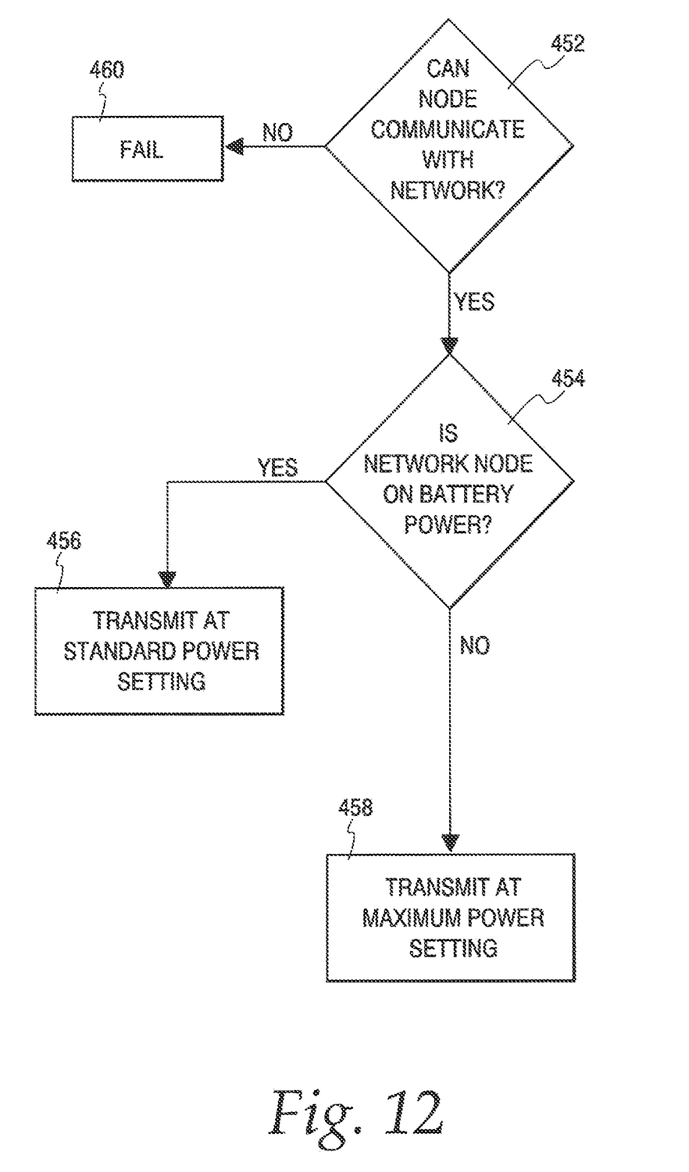
FIG. 12 is a flowchart illustrating a process by which a stationary network node can determine what power setting to send a message based on the power source in use at a particular time.

FIG. 12 presents a process by which a stationary network node can determine what power setting to send a message at based on the power source it is using at a particular time. In step 452, the stationary network node determines whether it can communicate with the target network. If not, the process fails and exits in step 460. However, if the stationary network node can communicate with the target network, execution transitions to step 454, where the node determines whether it is communicating using battery power. If so, execution transitions to step 456, where the message is sent using the standard power setting, as determined by, for example, the process of FIG. 7 or the process of FIG. 10. Returning to step 454, if the stationary network node is not operating off of battery power, then the message is sent using the maximum power setting in step 458.

The foregoing description has been presented for purposes of illustration, and is not intended to be exhaustive or to limit coverage of the claims that follow to the precise form disclosed. The description was devised to best explain to persons of skill in the art the principles of the disclosed network acquisition process when used with stationary non-continuous network nodes, such as faulted circuit indicators. It is fully intended that the inventors of this disclosure receive the full breadth allowed to them by law for the claims that follow, which should not be limited by this description.

What is claimed is:

1. A method operating within a faulted circuit indicator for use with a power monitoring network, the faulted circuit indicator comprising a microcontroller and a timer controlled by the microcontroller, the method comprising the steps of:
   i) initializing a transmit power setting, wherein the step of initializing comprises:
      evaluating a faulted circuit indicator message packet; and,
      when the message packet comprises electric power network fault information, initializing the transmit power setting as the maximum power setting;
   ii) broadcasting a join network request packet at the transmit power setting to a plurality of network nodes;
   iii) starting the timer that includes a maximum wait time;
   iv) while the timer runs, waiting for reception of a join network acknowledgement packet from a network node of the plurality of network nodes;
   v) incrementing the transmit power setting when a maximum wait time elapses before receipt of the join network acknowledgement packet from the network node of the plurality of network nodes; and
   vi) repeating steps ii-v until the join network acknowledgement packet is received by the faulted circuit indicator.

2. The method of claim 1 further comprising the steps of:
   vii) determining a power source for the faulted circuit indicator; and
   viii) when the power source is a battery, sending a message packet at the transmit power setting; and ix) when the power source is not a battery, sending a message packet at a power higher than the transmit power setting.

3. The method of claim 1, further comprising the step of storing the transmit power setting once the join network acknowledgement is received.

4. The method of claim 3, wherein the step of initializing a transmit power setting comprises retrieving the stored transmit power setting.

5. The method of claim 1, wherein the method is performed only when power is available to the faulted circuit indicator from one selected from a group consisting of: a continuous power source, an intermittent power source, a rechargeable power source, and combinations thereof.

6. A method operating within a faulted circuit indicator for use with a power monitoring network, the faulted circuit indicator comprising a microcontroller and a timer controlled by the microcontroller, the method comprising the steps of:
   i) initializing a transmit power setting, wherein the step of initializing comprises:
      evaluating a faulted circuit indicator message packet; and,
      when the message packet comprises electric power network fault information, initializing the transmit power setting as the maximum power setting;
   ii) broadcasting a join network request packet to a plurality of network nodes;
   iii) starting the timer that includes a maximum wait time;
   iv) while the timer runs, waiting for a reception of a join network acknowledgement packet from a network node of the plurality of network nodes;
      (1) when a maximum wait time elapses before reception of the join network acknowledgement packet from the network node, incrementing the transmit power setting and repeating steps ii-iv; and
      (2) when the join network acknowledgement packet is received, comparing an elapsed time to a network acquisition time metric; and
         (a) when the elapsed time satisfies the network acquisition time metric, joining the power monitoring network; and,
         (b) when the elapsed time does not satisfy the network acquisition time metric, incrementing the transmit power setting and repeating steps ii-iv.

7. The method of claim 6 further comprising the steps of:
   v) determining a power source for the faulted circuit indicator; and,
   vi) when the power source is a battery, sending a message packet at the transmit power setting; and,
   vii) when the power source is not a battery, sending a message packet at a power higher than the transmit power setting.

8. The method of claim 6 further comprising the steps of saving the transmit power setting when the join network acknowledgment packet is received.

9. The method of claim 6, further comprising the step of storing the transmit power setting once the join network acknowledgement is received.

10. The method of claim 9, wherein the step of initializing a transmit power setting comprises retrieving the stored transmit power setting.

11. The method of claim 6, wherein the method is performed only when power is available to the faulted circuit indicator from one selected from a group consisting of: a continuous power source, an intermittent power source, a rechargeable power source, and combinations thereof.

12. A method operating within a faulted circuit indicator for use with a power monitoring network, the faulted circuit indicator comprising a microcontroller and a timer controlled by the microcontroller, the method comprising the steps of:
- i) initializing a transmit power setting, wherein the step of initializing comprises:
  - evaluating a faulted circuit indicator message packet; and,
  - when the message packet comprises electric power network fault information, initializing the transmit power setting as the maximum power setting;
- ii) broadcasting a join network request packet to a plurality of network nodes;
- iii) starting the timer that includes a maximum wait time;
- iv) while the timer runs, waiting for a reception of a join network acknowledgement packet from a network node of the plurality of network nodes;
  - (1) when a maximum wait time elapses before receipt of the join network acknowledgement packet from the network node, incrementing the transmit power setting and repeating steps ii-iv; and
  - (2) when the join network acknowledgement packet is received, comparing a number of communicating nodes to a metric; and
    - (a) when the number of communicating nodes satisfies the metric, joining the power monitoring network; or
    - (b) when the number of communicating nodes does not satisfy the metric, incrementing the transmit power setting and repeating steps ii-iv.

13. The method of claim 12, further comprising the steps of:
- v) determining a power source for the faulted circuit indicator; and
- vii) when the power source is a battery, sending a message packet at the transmit power setting; and
- viii) when the power source is not a battery, sending a message packet at a power higher than the transmit power setting.

14. The method of claim 12 further comprising the steps of saving the transmit power setting when the join network acknowledgment packet is received.

15. A faulted circuit indicator for use with a power monitoring network comprising:
- i) an antenna;
- ii) a communication processor coupled to the antenna;
- iii) a microcontroller coupled to the communication processor;
- iv) a timer controlled by the microcontroller; and
- v) wherein the microcontroller is adapted to
  - (1) initialize a transmit power, wherein the step of initializing comprises:
    - evaluating a faulted circuit indicator message packet; and,
    - when the message packet comprises electric power network fault information, initializing the transmit power setting as the maximum power setting;
  - (2) broadcast a join network request packet to a plurality of network nodes,
  - (3) starting the timer that includes a maximum wait time,
  - (4) while the timer runs, wait for a reception of a join network acknowledgement packet from a network node of the plurality of network nodes,
  - (5) increment the transmit power when a maximum wait time elapses before receipt of the join network acknowledgement packet from the network node of the plurality of network nodes, and
  - (6) repeat 2-5 until the join network acknowledgement packet is received by the faulted circuit indicator.

16. The faulted circuit indicator of claim 15 further comprising a power source and wherein the microcontroller is further adapted to (7) determine a power source type for the faulted circuit indicator; and (8) when the power source type is a battery, send a message packet at the transmit power setting, and (9) when the power source is not a battery, send a message packet at a power higher than the transmit power setting.

17. The faulted circuit indicator of claim 15, wherein the microcontroller is further adapted to store the transmit power setting once the join network acknowledgement is received.

18. The faulted circuit indicator of claim 17, wherein the microcontroller is further adapted to initialize a transmit power setting comprises retrieving the stored transmit power setting.

19. The faulted circuit indicator of claim 18, wherein the microcontroller is further adapted to initialize a transmit power setting only when power is available to the faulted circuit indicator from one selected from a group consisting of: a continuous power source, an intermittent power source, a rechargeable power source, and combinations thereof.

20. A faulted circuit indicator for use with a power monitoring network comprising:
- i) an antenna;
- ii) a communication processor coupled to the antenna;
- iii) a microcontroller coupled to the communication processor;
- iv) a timer controlled by the microcontroller; and
- v) wherein the microcontroller is adapted to
  - (1) initialize a transmit power, wherein the step of initializing comprises:
    - evaluating a faulted circuit indicator message packet; and,
    - when the message packet comprises electric power network fault information, initializing the transmit power setting as the maximum power setting;
  - (2) broadcast a join network request packet to a plurality of network nodes,
  - (3) starting the timer that includes a maximum wait time,
  - (4) while the timer runs, wait for a reception of a join network acknowledgement packet from a network node of the plurality of network nodes, and
    - (4.a) when a maximum wait time elapses before reception of the join network acknowledgement packet from the network node, increment the transmit power and repeat steps 2-4; and
    - (4.b) when the join network acknowledgement packet is received compare an elapsed time to a network acquisition time metric, and
      - (4.b.1) when the elapsed time satisfies the network acquisition time metric, join the power monitoring network; and
      - (4.b.2) when the elapsed time does not satisfy the network acquisition time metric, increment the transmit power and repeat steps 2-4.

21. The faulted circuit indicator of claim 20 further comprising a power source and wherein the microcontroller is further adapted to (5) determine a power source type for the faulted circuit indicator; and (5.a) when the power source type is a battery, send a message packet at the transmit power setting, and (5.b) when the power source is not a battery, send a message packet at a power higher than the transmit power setting.

22. The faulted circuit indicator of claim 20 wherein the microcontroller is further adapted to save the transmit power setting when the join network acknowledgment packet is received.

23. A faulted circuit indicator for use with a power monitoring network comprising:
   i) an antenna;
   ii) a communication processor coupled to the antenna;
   iii) a microcontroller coupled to the communication processor;
   iv) a timer controlled by the microcontroller; and
   v) wherein the microcontroller is adapted to
      (1) initialize a transmit power, wherein the step of initializing comprises:
         evaluating a faulted circuit indicator message packet; and,
         when the message packet comprises electric power network fault information, initializing the transmit power setting as the maximum power setting;
      (2) broadcast a join network request packet to a plurality of network nodes,
      (3) starting the timer that includes a maximum wait time,
      (4) while the timer runs, wait for a reception of a join network acknowledgement packet from a network node of the plurality of network nodes,
         (4.a) when a maximum wait time elapses before reception of the join network acknowledgement packet from the network node, increment the transmit power and repeat steps 2-4; and
         (4.b) when the join network acknowledgement packet is received compare a number of communicating nodes to a metric, and
            (4.b.1) when the number of communicating nodes satisfies the metric, join the power monitoring network; and
            (4.b.2) when the number of communicating nodes does not satisfy the metric, increment the transmit power and repeat steps 2-4.

24. The faulted circuit indicator of claim 23 further comprising a power source and wherein the microcontroller is further adapted to (5) determine a power source type for the faulted circuit indicator; and (5.a) when the power source type is a battery, send a message packet at the transmit power setting, and (5.b) when the power source is not a battery, send a message packet at a power higher than the transmit power setting.

25. The faulted circuit indicator of claim 23 wherein the microcontroller is further adapted to save the transmit power setting when the join network acknowledgment packet is received.

\* \* \* \* \*